United States Patent
Richards et al.

(10) Patent No.: US 6,507,829 B1
(45) Date of Patent: Jan. 14, 2003

(54) TEXTUAL DATA CLASSIFICATION METHOD AND APPARATUS

(75) Inventors: Jon Michael Richards, San Francisco, CA (US); Andras Kornai, Arlington, MA (US)

(73) Assignee: PPD Development, Lp, Wilmington, NC (US)

( * ) Notice: Subject to any disclaimer, the term of this patent is extended or adjusted under 35 U.S.C. 154(b) by 0 days.

(21) Appl. No.: 09/483,828

(22) Filed: Jan. 17, 2000

Related U.S. Application Data

(60) Provisional application No. 60/139,959, filed on Jun. 18, 1999.

(51) Int. Cl.$^7$ .............................................. G06F 17/00
(52) U.S. Cl. ............................................. 706/45; 704/9
(58) Field of Search ............................. 706/45, 46, 12; 700/49

(56) References Cited

U.S. PATENT DOCUMENTS 5,991,714 A * 11/1999 Shaner .......................... 704/1

OTHER PUBLICATIONS

Duda, Richard O.; Hart, Peter E.; Stork, David G., "Linear Discriminant Functions", Chapter 5, *Pattern Classification and Scene Analysis: Pattern Classification*, Wiley, 1999.

Divita, Guy; Browne, Allen C; and Rindflesch, Thomas C., "Evaluating Lexical Variant Generation to Improve Information Retrieval", *Proc. American Informatics Association 1998 Annual Symposium*.

Fizames, Christian, MD, MPh, "How to Improve the Medical Quality of the Coding Reports Based on Who–Art and Costart Use", *Drug Information Journal*, vol. 31, pp. 85–92, 1997.

Lewis, David D.; Schapire, Robert E.; Callan, James P.; Papka, Ron, "Training Algorithms for Linear Text Classifiers", in proceedings of Annual Meeting of ACM Special Interest Group Information Retrieval, pp. 298–306, SGIR'96 Zurich, Switzerland, 1996.

Chute, Christopher C.; Yang, Yiming, "An Overview of Statistical Methods for the Classification and Retrieval of Patient Events", *Methods of Information in Medicine*, vol. 34, No. 1/2, pp. 104–109, 1995.

Gillum, Terry L.; George, Robert H.; Leitmeyer, Jack E., "An Autoencoder for Clinical and Regulatory Data Processing", *Drug Information Journal*, vol. 29, pp. 107–113, 1995.

(List continued on next page.)

Primary Examiner—Thomas Black
Assistant Examiner—Joseph P. Hirl
(74) Attorney, Agent, or Firm—Sheridon Ross P.C.

(57) ABSTRACT

A method and apparatus for classifying textual data is provided. The invention is adapted to automatically classify text. In particular, the invention utilizes a sparse vector framework to evaluate natural language text and to accurately and automatically assign that text to a predetermined classification. This can be done even where the disclosed system has not seen an example of the exact text before. The disclosed method and apparatus are particularly well-suited for coding adverse event reports, commonly referred to as "verbatims," generated during clinical trials of pharmaceuticals, The invention also provides a method and apparatus that can be used to translate verbatims that have already been classified according to one coding scheme to be translated to another coding scheme in a highly automated process.

30 Claims, 2 Drawing Sheets

Microfiche Appendix Included
(3 Microfiche, 127 Pages)

OTHER PUBLICATIONS

Schütze, Hinrich; Hull, David A.; Pedersen, Jan O., "A Comparison of Classifiers and Document Representations for the Routing Problem", in proceedings of Annual Meeting of ACM Special Interest Group Information Retrieval, pp. 229–237, SGIR'95 Seattle, WA, 1995.

Dupin–Spriet, Thérèse, Ph.D.; Spriet, Alain, Ph.D., "Coding Errors: Classification, Detection, and Prevention", *Drug Information Journal*, vol. 28, pp. 787–790, 1994.

Press, William H.; Teukolsky, Saul A.; Vetterling, William T.; Flannery, Brian P., "Numerical Recipes in C: The Art of Scientific Computing", second edition, Cambridge University Press, Cambridge UK, 1993.

Joseph, Michael C., MD, MPH; Schoeffler, Kath; Doi, Peggy A.; Yefko, Helen; Engle, Cindy; Nissman, Erika F., "An Automated Costart Coding Scheme", *Drug Information Journal*, vol. 25, pp. 97–108, 1991.

Abney, Steven P., "Parsing by Chunks", *Principal–Based Parsing: Computation and Pshycholinguistics*, 257–278, Kluwer Academic Publishers, 1991.

Tou, Julius T; Gonzalez, Rafael C., "Trainable Pattern Classifiers, the Deterministic Approach", Chapter 5, *Pattern Recognition Principles*, Addison Wesley, Reading, MA 1974.

* cited by examiner

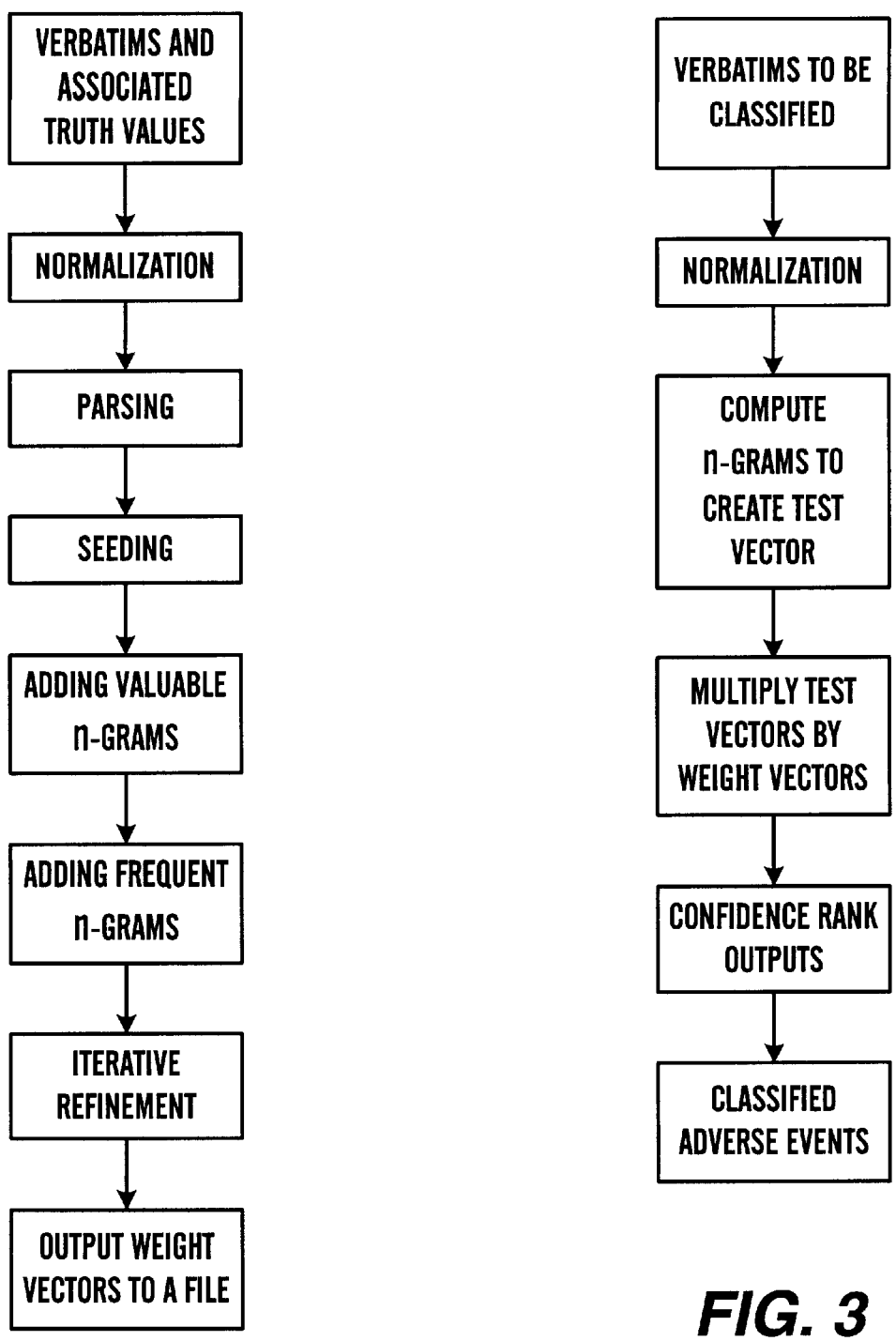

TEXTUAL DATA CLASSIFICATION METHOD AND APPARATUS

RELATED APPLICATIONS

This application claims the benefits under 35 U.S.C. §119(e) from U.S. Provisional Patent Application No. 60/139,959 entitled "TEXTUAL DATA CLASSIFICATION METHOD AND APPARATUS" filed Jun. 18, 1999, which is incorporated by reference herein in its entirety.

STATEMENT OF GOVERNMENT SUPPORT

The invention was made with government support under Grant Number 5R44CA65250, awarded by the DHHS. The government has certain rights in the invention.

MICROFICHE APPENDIX

This application contains a microfiche appendix consisting of three microfiche comprising 127 frames.

FIELD OF THE INVENTION

The present invention is directed to a computer-based method and apparatus for classifying textual data.

BACKGROUND OF THE INVENTION

A portion of the disclosure of this patent document contains material which is subject to copyright protection. The copyright owner has no objection to the facsimile reproduction by any one of the patent disclosure, as it appears in the U.S. Patent and Trademark Office patent files or records, but otherwise reserves all copyright rights whatsoever.

The present invention is directed to a computer-based method and apparatus for classifying textual data. One application of the invention is a computer-based method and apparatus for classifying clinical trial adverse event reports. In the field of pharmaceuticals intended for the treatment of humans, clinical trials are used to validate the efficacy and safety of new drugs. These clinical trials are conducted with the participation of physicians, who monitor the health of persons involved in the trial.

Any symptom of a disease or malady, or degradation in the health of a patient participating in a clinical trial is termed an adverse event. Once such adverse events are observed or reported to the physician responsible for monitoring the health of a patient, an adverse event report is generated. These adverse event reports typically include short descriptions of the symptoms or health effect that resulted in the report. The reports generally omit all but those terms that are significant to the description of the adverse event being reported. However, given the nature of language, it is possible to describe one event in a very large number of ways. Accordingly, one patient who experiences headaches during a trial may have their symptoms described by a physician as "headache, migraine", while another patient who experiences headaches may have their symptoms described as "migraine headache" or simply as "headache." In addition to the variations in describing adverse events due to differing word combinations, the physicians who prepare the adverse event reports may resort to synonyms (e.g. describing pain in the abdomen as "pain in the stomach" or "pain in the belly") or to abbreviations. Additionally, the reports are abbreviated in their syntax (e.g. "allergy, arms and legs" rather than "skin allergy on the arms and legs"). Adverse event reports are also often collected from all over the world. Therefore, adverse event reports can be in a number of languages, in addition to English.

The text that comprises an individual adverse event report is known as a verbatim. The verbatims must be collected and the information they contain must be sorted, so that the significance of the various symptoms and health effects reported in the verbatims can be considered. Traditionally this work has been carried out by humans who read the verbatims and assign them to predefined categories of adverse events. A number of systems exist for categorizing verbatims. These include WHOART, COSTART, and MedDRA. However, coding verbatims is tedious and human coders introduce a certain amount of error. Furthermore, a physician is often required to interpret verbatims and to put them into their proper classification. For reasons such as cost, however, physicians are generally not employed for such work.

Computer programs that exist for assisting human coders in properly and easily classifying verbatims in accordance with the above-mentioned systems suffer from a number of drawbacks. In particular, existing systems are often incapable of automatically coding verbatims that do not conform to a verbatim that has been coded before. Therefore, existing automated systems generally cannot code a verbatim that varies from previously coded verbatims in the significant terms it employs. Although existing systems may sometimes include the capability of memorizing new verbatims, so that coding will be automatic if a previously coded verbatim occurs again, such a capability has limited use. This is because, as described above, similar adverse events can be described in an almost infite number of ways. The possible combinations of words in a language number in the billions, even when the length of the combinations is restricted to those of five words or less.

Another impediment to producing reliable automated coding systems is that it is difficult to obtain real world verbatims that can be used as the basis for the automatic coding provisions of existing systems. This is because such data is usually proprietary, and even if not proprietary, is difficult to obtain. As a result, existing automated systems have typically been developed using the English language definitions of the categories set forth in the various classification schemes, rather than actual verbatims produced in the course of clinical trials.

As a result of the above-described limitations and difficulties, existing automated systems are rarely successful in identifying and classifying a verbatim that has not been seen before. Where a verbatim cannot be automatically coded, existing automated systems provide machine assistance in hand coding the verbatim. This is done by means of weak pattern matching functions, such as spelling normalization and stemming. Following pattern matching, the system typically offers the coder categories that the program has determined the verbatim may properly fall into.

Another difficulty in the field of clinical trial adverse event reporting is the translation of study results coded according to one classification scheme to another classification scheme. A system and method for performing such a translation would be useful because there is only limited correspondence between the categories of the various classification schemes. Translation is often desirable to compare the results obtained by different trials. However, at present, no program exists that can perform this function effectively and without large amounts of human assistance.

SUMMARY OF THE INVENTION

The present invention is capable of automatically coding the majority of the verbatims it encounters. In addition, the present invention is capable of reliably flagging those verbatims that still require coding by a human. Experiments have shown that existing auto coding systems are capable of coding only about one quarter of the verbatims in a study with high confidence. In contrast, the present invention is capable of auto coding approximately two thirds of the verbatims in a study with an error rate that is comparable to the error rate encountered using human coders. For those verbatims that the system of the present invention is incapable of auto coding, the human coder is presented with a list containing up to ten categories from which to choose the proper code. These categories are ordered, with the most likely ones appearing at the top of the list. By intelligently limiting the codes presented, the present invention is capable of improving the error rates encountered when coding verbatims. In addition, the automated system of the present invention is capable of coding a large number of verbatims in a short period of time, and of reducing the amount of time and level of intervention required of human coders. Furthermore, the present invention allows verbatims classified in one coding scheme to be translated to another coding scheme in a highly automated process.

The present invention uses a sparse vector framework to enable the system to, in effect, employ vectors of sizes up to $10^{300}$. This is done by performing the multiplication steps necessary to evaluate information-containing dimensions in the matrix only on those dimensions that have a non-zero value. This method allows the program to effectively use a large amount of knowledge gained from training data to evaluate natural language text that has not been seen by the system before.

According to an embodiment of the present invention, a count vector is constructed for each verbatim. The size of the matrix comprising this count vector is typically about $10^{32}$, but can be much larger if desired. A count vector is constructed for each verbatim that has been input into the system. The count vector contains a dimension for each n-gram or combination of n-words of up to a certain length that could occur in the verbatim. Only those dimensions that correspond to n-grams found in the verbatim will contain a non-zero numerical value. The count vector for each verbatim is then saved by the system. However, in the step of saving, the present invention rejects those dimensions that equal zero. Therefore, only dimensions that correspond to the n-grams found in the verbatim for which the count vector has been constructed are stored. This step eliminates the problem of storing such a large matrix that would be encountered by a conventional system or program.

A similar step is taken by this embodiment of the present invention with respect to weight vectors. Like count vectors, the size of weight vectors are very large because they ideally contain dimensions for all possible combinations of words up to a determined length. Weight vectors are generated for each classification within a classification system. Using prior art techniques, even one weight vector would be incapable of being used in a computation, much less the hundreds of weight vectors needed to properly code adverse event reports.

Weight vectors collect the numerical weights that have been associated with each n-gram for a particular class. An n-gram is insignificant to a classification if it does not tend to direct a verbatim towards or away from being coded within the subject classification. Therefore, a significant n-gram will have a non-zero value, which is assigned to the dimension of the vector that corresponds to the particular n-gram. Although the size of each vector is very large, the system and method of the present invention can store and perform calculations using such a vector because it stores only the significant dimensions. This not only eliminates the storage problems encountered by prior art systems, but also enables existing computer hardware running a computer program written according to the present invention to perform calculations using the data.

The apparatus and method of the present invention generally includes a system that is trained to correctly code verbatims. The trained system is then used to code verbatims collected during real world clinical trials. The present invention, therefore, describes a computer-based system and method for classifying natural language text data.

The method and apparatus of the present invention features two modes, training and classification. In training mode, input consisting of verbatims and associated truth values is introduced to the system to produce an output consisting of weight vectors. Truth values are simply classifications to which the verbatims correspond. Training generally includes the steps of normalization, parsing, initialization, n-gram analysis, addition of frequent n-grams, and iterative refinement. When in classification mode, the weight vectors produced during training are used to generate a list of truth values and confidences for each verbatim that is read into the system. The classification mode generally includes the steps of reading the weight vectors, normalization, multiplying the test vectors by the weight vectors, confidence ranking the resulting output, and producing the output.

BRIEF DESCRIPTION OF THE DRAWINGS

FIG. 2 is a flowchart illustrating the operations performed while the system is in training mode; and FIG. 3 is a flowchart illustrating the operations performed while the system is in classification mode.

DETAILED DESCRIPTION

Figure 1:
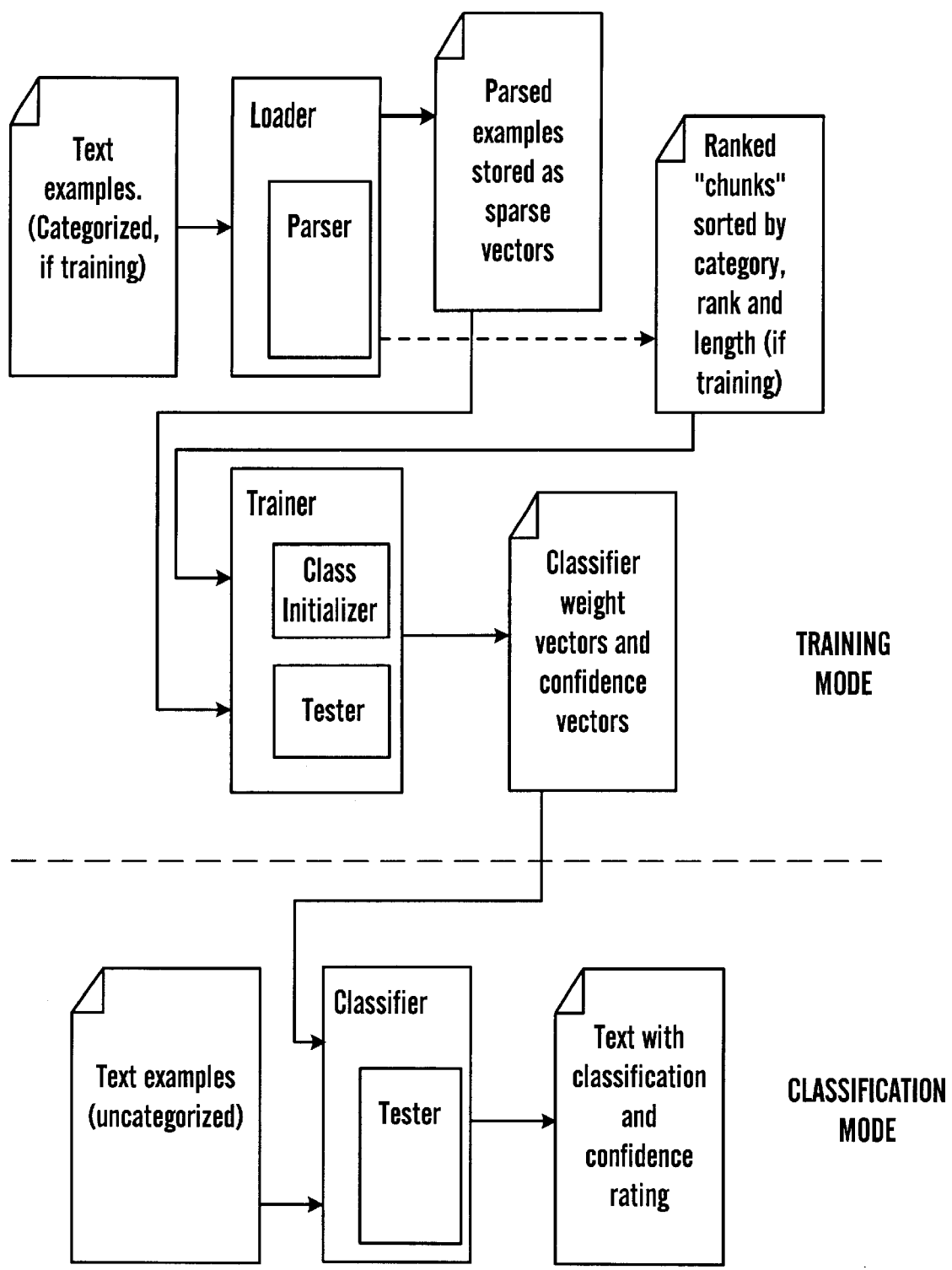
FIG. 1 is a flowchart illustrating functions of the invention.

The present invention is useful to extract significant information from natural language descriptions or text, and to classifying that natural language text according to a classification scheme. Therefore, the present invention has application to a wide range of information retrieval problems. In particular, the method and apparatus of the present invention may be used to automatically code adverse event reports generated during clinical trials of pharmaceutical products. This invention is executable on any computer system. In particular the invention, in a presently preferred embodiment, is suitable for execution on any computer running the Java Platform and that includes a CPU, main storage, I/O resources, and a user interface. The source code of a presently preferred embodiment of the invention is listed in the microfiche appendix, and is incorporated by reference herein in its entirety.

A system according to the present invention for categorizing adverse event reports (or verbatims) may include a database file containing verbatims to be coded, computer memory for storing the verbatims, a processor for carrying out the instructions of a computer program written in accordance with the present invention, and means for outputting the results of the classification to a human operator or to a storage file (e.g. a database file).

FIG. 1 is an overall flowchart illustrating the functions of the invention. The flowchart also illustrates the major operations performed on the data during the operating modes of training and classification. The training mode and the major steps generally included in that mode are illustrated in FIG. 2. Generally, in training mode, the system receives a set of verbatims and associated truth values. The training mode then outputs a file containing weight vectors, which are later used during classification. FIG. 3 illustrates the major steps performed during classification.

The verbatims introduced to the system during training are typically obtained from clinical trials whose results have already been classified. Therefore, the verbatims are real world adverse event reports, and the proper classification of those reports (the "truth values") has already been determined. The truth value is simply a numerical representation of the correct classification for a particular verbatim. Therefore, each individual description defined by the classification system for a particular adverse event has a unique identifying value. A typical set of input data for training the system consists of from about 2000 to about 200,000 verbatims.

The verbatims read into the system are then normalized. The step of normalization generally includes spell correction and standardization of characters and symbols using techniques that are well-known in the art. Normalization may also include the well-known step of stemming, where words in the verbatims are reduced to their stems, and only the word stems are used during the subsequent steps of categorization. For an example see the ac.2.parse.Parser.normalize method in the program listings. A further optional step during normalization is data enrichment. Data enrichment may include the use of a synonym table. This technique is also well-known in the art, and generally consists of increasing the word count for words found in the verbatim, and at the same time increasing the word count for the synonyms of the words literally appearing in the verbatim.

After the verbatims have been normalized, they are parsed. See Parserjava in the program listings. The step of parsing itself is also known in the art, and generally involves breaking the textual descriptions of the verbatims into segments. However, according to the present invention, the segments are defined by the punctuation and functional syntax of the description. According to the present invention, the sentence fragments obtained through parsing are ranked according to their significance. This novel step allows the program to attribute greater importance to those fragments that receive a higher rank. According to the present invention, the rank is determined by whether and how much punctuation and function words are contained in a fragment. See also ClassInitjava in the program listings. Note that in the Java code the chunks are called "Frags" (fragments). One possible implementation of our parsing algorithm is the ac2.parse.Parser.doShallawParse method.

In addition, the parsing of the present invention ranks the fragments of natural language that have been determined by the step of parsing. According to this ranking scheme, the highest rank (Rank 0) is assigned to the most important sentence fragments or chunks, while the rank of 1 or higher is assigned to those fragments that are less important. Verbatims that contain no punctuation or other special words that cause it to be ranked otherwise are considered to be the most important and therefore are assigned Rank 0. This is because all of the information that is significant to the classification of the verbatim will be contained in that fragment. Verbatims that contain punctuation, such as commas or hyphens are ranked 1 or higher, based on the structure of the verbatim with respect to punctuation and function words. In addition to typical punctuation marks, words such as "and" or "not" can also be recognized as disqualifying a verbatim from rank 0. As an example, the chunk "dull headache" receives Rank 0, while "dull headache—persistent" receives Rank 1. This novel ranking of sentence fragments allows the present invention to return more accurate results during classification by assigning a higher weight value to the more highly ranked fragments. That is, those fragments that have been interpreted as being more significant to the information in the verbatim (e.g. Rank 0) are allowed to exert more control than fragments interpreted as being less significant (e.g. Rank 1) over the process of determining whether verbatims containing the same fragment should be included in the same class as the text fragment during classification. Thus, the present invention recognizes that the fragments used in a verbatim are not of equal significance. Including such a recognition in the training of the system improves the accuracy of the model, and hence the ultimate results. The method ac2. ClassInit.addAtomicfrags adds chunks of rank 0 or 1, with length 1 or 2, to the model.

As described above, during the step of parsing the verbatim, the text is divided according to its structure. The way in which the phrase "pre-menstrual symptom-lack of concentration-bloating-dull headache" is parsed by the system will now be considered as an example of the system in operation. In the given example, the Rank 0 n-grams will be "pre", "menstrual symptom", "lack of concentration", "bloating", and "dull headache." Because of the punctuation appearing in this verbatim, there will also be higher ranked n-grams. The Rank 1 n-grams will be "pre-menstrual symptom", "menstrual symptom-lack of concentration", "lack of concentration-bloating", "bloating-dull headache." The given example will also produce n-grams having Rank 2. These are "pre-menstrual symptom-lack of concentration", "menstrual symptom-lack of concentration-bloating", and "lack of concentration-bloating-dull headache." If desired, lower importance (higher numerical) ranks may also be collected. Weights may then be assigned to the sentence fragments extracted from the verbatim. This allows the system to reliably extract the significant information from a verbatim, while conserving computer storage and computational resources.

Next is the step of seeding. In seeding, all of the fragments that have been assigned a rank of 0 or 1 are considered. As a result of the parsing and ranking steps, only single words or combinations of words having no punctuation between them will have been assigned Rank 0. Only those fragments having at most one punctuation character receive Rank 1. Single words (unigrams) or combinations of two or more words are collectively referred to as n-grams. The n-grams gathered during seeding are considered to have greater significance than n-grams having a rank of 2 or higher.

The valuable n-grams are then assigned a weight of 1 in the vectors characterizing the class in question. Valuable n-grams are those of rank 0 or 1, having a length of less than 4. Therefore, it can be seen that only a limited number of fragments will be considered valuable. Such n-grams are valuable because, for so few words to span a fragment, they must contain a great deal of information. This can be understood as a lack of filler or surplus words. However, otherwise valuable fragments that appear only once (have a frequency of one) are not assigned weights, because they are not valuable to the coding of a set of verbatims because they are often errors or idiosyncratic usages. Identifying valuable n-grams assists the system in accurately coding verbatims, because these core terms are so significant they usually will determine the correct classification of a verbatim. Valuable chunks receive a higher vector weight than longer chunks.

The next step taken in training is to count the frequencies with which the remaining n-grams occur. This can be done to n-grams of any rank and any n-value, or can be performed only for limited ranks and values of n. Frequency counting is performed for every classification or truth value that appears in a classification system. Those n-grams which appear only once are omitted, leaving classifiers with non-zero values for several thousand n-grams. For an example see the listing ac2. ClassInit.addstatVals which collects frequency data in the vector tempWeightVecs. Of course, this is much less than the vectors available in the entire space (ie. the entire set of words or word combinations occurring in the union of English and other languages used in the trial, which numbers in the billions of n-gram dimensions). To handle such large vectors (each coordinate in this space corresponds to an n-gram) is a nontrivial problem which the invention solves by a specially designed sparse vector library: an example implementation is provided in the sparsevec directory of the attached listings. The frequency with which an n-gram or vector occurs will in part determine the value of the weight assigned to that n-gram in the vector.

The system is then trained using iterative refinement. In this step, the verbatims for which truth values are known are entered into the system and classified using the weight vectors obtained for various n-grams during the training process. Those verbatims that have been misclassified are analyzed, and the weights assigned to n-grams appearing in the verbatim are adjusted. During iterative refinement, the weight of n-grams that appear in a verbatim that should have directed the verbatim to a particular classification, but failed to, have their weight increased. Similarly, n-grams having a weight towards a particular classification that resulted in a misclassification have their weight reduced. This process is continued until acceptable accuracy is achieved. The techniques used to implement this iterative refinement can be according to any of a number of well-known techniques. One example implementing the well known "perceptron update" is provided in the attached listings under Trainer-java. The above steps are performed by the ac2. Trainer class with assistance from ac2. test. Tester class. Of course, in carrying out this iteration it is important to avoid over-fitting the data, which would make the trained system less useful when it is applied to sets of data other than the one on which it was trained.

After the system has been trained, it is ready to be used in the classification mode. During classification, verbatims are typically read into the system from a flat database file. During classification verbatims from actual clinical trials are truthed according to the particular classification for which the system has been trained. The first step in classifying the verbatims is normalization. During normalization, the spelling of words in the verbatims is corrected and the letters in all of the words in the verbatim are made uppercase. Punctuation is also normalized.

Optionally, the step of normalizing the verbatims may include stemming, where words are reduced to their stems. Another alternative step during normalization is to perform synonym-based data enrichment. Spell correction, normalization of the characters, stemming, and synonym-based data enrichment are all steps well understood in the field of information extraction and retrieval. The listings in the microfiche appendix contain an implementation PorterStemmerjava of the Porter method of stemming, with some enhancements for the medical lexicon.

As a next step, the scalar products of the vector and the weight vectors are computed. This involves multiplying frequency of terms extracted from the verbatim, which are summarized in count vectors within the space defined by the individual words and multi-word n-grams ranked during training, by the weight given those n-grams during training. This scalar product calculation is performed for each weight vector. The attached listings of sparsevec.SparseDoubleVectorRBT show that the sparse vector library can be designed to optimize the speed of the scalar product operation while requiring only 0 (log n) operations for insertion and deletion. The particular class having the highest numerical value following this calculation is the class into which the verbatim is placed. Where the numerical value fails to reach a chosen threshold, or fails to differ sufficiently from the values chosen for other classes, the verbatim may be flagged for coding by a human.

Another novel aspect of the present invention is the recognition that for certain applications, such as for classification of adverse events in clinical trials, a first higher level of classification can be used based on natural Euclidean space. This technique is a unique application of hierarchical classification for systems having a natural three dimensional arrangement. More particularly, the various classifications in a given system can be structured according to their natural structure in Euclidean space. For example, in a system for classifying adverse events in clinical trials, the natural structure involved is the human body. Thus, when classifying information, a first evaluation is made with regard to whether the information is global or local. For example, global information could pertain to general disorders of the body as a whole. If information is global, then it is classified by a second lower level of elementary classification, such as is described above in detail. However, if the information is local, it is classified into one of the defined local systems. The local systems or terms can be ordered in a rational order, such as from top to bottom and from in to out. For complex systems, such as the cardiovascular system, the linguistic "head" of the system, in this case the heart, is used to define the point of ordering. Once the information or entry is defined by this higher level classification based on natural Euclidean space, then a second lower level of elementary classification can occur.

The operation of the method and apparatus of the present invention in classification mode can more easily be seen by way of an example. If the system reads a verbatim containing the term "pre-menstrual symptom-lack of concentration-bloating-dull headache" the verbatim will first be normalized. After normalization, the verbatim will appear as "PRE-MENSIRUAL SYMPTOM-LACK OF CONCENTRATION-BLOATING-DULL HEADACHE".

The actual step of classifying the verbatim is achieved by multiplying the n-gram vector by the weight vector associated with that n-gram vector for each classification in the classification system. Thus, weight vectors developed using the novel methods described above are used in a conventional manner for classification. As a continuation of the example, therefore, if there is a Class 1421 entitled "pre-menstrual symptoms" that is the proper classification or truth value for the multiplication step which may occur as follows. Considering only the Rank 0 and Rank 1 sentence fragments, the weights assigned to the fragments with respect to Class 1421 might be as follows:

| N-GRAM | FREQUENCY | VECTOR WEIGHT | PRODUCT |
| --- | --- | --- | --- |
| "pre" | 1 | 0 | 0 |
| "menstrual symptom" | 1 | .8 | .8 |
| "lack of concentration" | 1 | .05 | .05 |
| "bloating" | 1 | .4 | .4 |
| "dull headache" | 1 | .05 | .05 |
| "pre-menstrual symptom" | 1 | .98 | .98 |
| "menstrual symptom-lack of concentration" | 1 | .9 | .9 |
| "lack of concentration-bloating" | 1 | .2 | .2 |
| "bloating-dull headache" | 1 | .15 | .15 |
| SUM | | | 3.53 |

Therefore, with respect to Classification 1421, the verbatim will be assigned the numerical value 3.53.

To further illustrate the classification system, the numerical value obtained for the example verbatim in the classification for tension headaches will now be considered. If the classification system on which the automated system of the present invention has been trained assigns classification "tension headaches" to Classification 415, the product of the occurrences of the n-grams and the weighting for those n-grams in Classification 415 might be as follows:

| N-GRAM | FREQUENCY | VECTOR WEIGHT | PRODUCT |
| --- | --- | --- | --- |
| "pre" | 1 | 0 | 0 |
| "menstrual symptom" | 1 | .1 | .1 |
| "lack of concentration" | 1 | .5 | .5 |
| "bloating" | 1 | 0 | 0 |
| "dull headache" | 1 | .9 | .9 |
| "pre-menstrual symptom" | 1 | .2 | .2 |
| "menstrual symptom-lack of concentration" | 1 | .05 | .05 |
| "lack of concentration-bloating" | 1 | 0 | 0 |
| "bloating-dull headache" | 1 | .5 | .5 |
| SUM | | | 2.25 |

Here it can be seen that the sum of the products for the Classification 415 "tension headache" is 2.25. Because this is less than the sum of the products for Classification 1421 "pre-menstrual symptom", the automated system of the present invention will code this example verbatim as Classification 1421 "pre-menstrual symptom."

Where the sum of the products for one classification is within a predetermined range of the sum of the products for other classifications, the coding of the verbatim may be considered uncertain. In these instances, the human coder can be presented with a listing of the classifications that appear within the predetermined range. The order in which these classifications are presented can be determined by the sum of the products in each classification. By way of example, if the predetermined range of uncertainty is 0.2 and the sum of the products for a particular verbatim in the classification for "blurred vision" is 2.5, the sum of the products for the verbatim in the classification for "migraine headache" is 2.4, and the sum of the products for the verbatim in the classification for "general neurological disorder" is 2.3, and there are no other classifications having a higher numerical value, the result may considered uncertain. A system may then present the human coder with the choices "blurred vision", "migraine headache", and "general neurological disorder", in that order, and allow the human coder to determine the appropriate classification. Therefore, it can be seen that the method and apparatus of the present invention provides human coders with an ordered choice of likely classifications for a verbatim that requires analysis by a human.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A system for assigning a natural language text to a class within a classification system, comprising:
   inputting a natural language text to be classified;
   identifying chunks within said natural language text having at least a first rank, wherein said chunks comprise n-grams including at least one of a complete natural language word and an abbreviated natural language word;
   assigning a weight vector to identified n-grams for each of multiple classifications
   determining a count vector for each of said identified n-grams;
   computing a scalar product of each of the count vectors and weight vectors assigned to identified n-grams for each of the multiple classifications;
   computing a sum of said scalar products for each of the multiple classifications;
   assigning the natural language text to the classification for which the highest sum of scalar products is computed;
   wherein weight vectors are represented as sparse vectors;
   wherein the weight vectors are determined by a process comprising initialization and iteration, wherein said classifications are related to a meaning of said chunks, and wherein the assigned classification is related to a meaning of the natural language text.

2. A system, as claimed in claim 1, wherein chunks including the entire inputted natural language text are ranked with the highest importance.

3. A system, as claimed in claim 1, wherein a subset of the highest ranking chunks is used to identify n-grams occurring more than once in the subset of highest ranking chunks.

4. A system, as claimed in claim 1, wherein the process of determining weight vectors includes n-gram frequency analysis of the chunks for chunks occurring more than once.

5. A system, as claimed in claim 4, wherein the process of n-gram frequency analysis is implemented for chunks longer than a given threshold.

6. A system, as claimed in claim 1, further comprising, before the step of computing n-grams from the natural language description, normalizing the natural language description.

7. A method for determining weight vectors for use in classifying a natural language text within a classification system, comprising:

providing a set of natural language descriptions correctly classified in the classification system;

parsing the correctly classified natural language text into chunks;

ranking the chunks into hypothesized hierarchical importance;

identifying n-grams occurring more than once in a subset of highest ranking chunks;

creating weight vectors based on a frequency analysis for n-grams occurring more than once;

provisionally classifying the natural language text to classes based on the created weight vectors;

comparing the provisional classifications with the correct classifications; and adjusting weight vectors to improve the accuracy of classification, wherein said classes relate to a meaning of said natural language text.

8. A method, as claimed in claim 7, wherein the n-grams are used in classification for n values higher than 3.

9. A method, as claimed in claim 7, wherein the frequency analysis is implemented for chunks longer than a given threshold.

10. A method, as claimed in claim 7, wherein chunks including an entire corresponding natural language description are ranked with the highest importance.

11. A method, as claimed in claim 7, further comprising, before the step of parsing the natural language text, normalizing the text.

12. The system of claim 1, wherein a weight vector assigned to at least one of said identified n-grams is zero.

13. A method for classifying the contents of natural language text, comprising:

receiving natural language text;

parsing said natural language text into at least a first chunk, wherein said at least a first chunk comprises a chunk of said natural language text that does not include any punctuation marks;

counting a number of instances of said first chunk to obtain a frequency for said first chunk;

multiplying said frequency for said first chunk by a first vector weight assigned to said first chunk with respect to a first classification related to a first meaning of said chunk to obtain a first product;

multiplying said frequency for said first chunk by a second vector weight assigned to said first chunk with respect to a second classification related to a second meaning of said chunk to obtain a second product;

determining a first sum, wherein said first sum is equal to a sum of all products associated with said first classification;

determining a second sum, wherein said second sum is equal to a sum of all products associated with said second classification;

in response to said first sum being greater than said second sum, assigning said natural language text to said first classification; and in response to said second sum being greater than said first sum, assigning said natural language text to said second classification.

14. The method of claim 13, further comprising:

parsing said natural language text into at least a second chunk, wherein said at least a second chunk comprises at least a first punctuation mark;

counting a number of instances of said second chunk to obtain a frequency for said second chunk;

multiplying said frequency for said second chunk by a third vector weight assigned to said second chunk with respect to said first classification to obtain a third product;

multiplying said frequency for said second chunk by a fourth vector weight assigned to said second chunk with respect to said second classification to obtain a fourth product;

wherein said step of determining a first sum comprises calculating a sum of said first and third products; and wherein said step of determining a second sum comprises calculating a sum of said second and fourth products.

15. The method of claim 13, wherein said first and said second vector weights are represented as sparse vectors.

16. The method of claim 13, further comprising:

in response to a difference between said first sum and said second sum that is less than a predetermined amount, assigning said natural language text to human coder for classification.

17. The method of claim 16, wherein at least one of said first sum and said second sum is non-zero, said method further comprising:

presenting said human coder with said classifications for which a corresponding sum is non-zero as a list of suggested classifications.

18. The method of claim 17, wherein said list is ordered according to a magnitude of each of said sums.

19. The method of claim 13, wherein each of said chunks comprises at least a first n-gram, wherein an n-gram is at least one of a natural language word and an abbreviation of a natural language word comprising at least one textual character.

20. The method of claim 13, wherein said first classification comprises a first adverse event category and wherein said second classification comprises a second adverse event category.

21. The method of claim 13, wherein said natural language text comprises an adverse event report.

22. A method for assigning a relevancy weight to a chunk of natural language text with respect to a plurality of classifications, comprising:

receiving a plurality of examples of natural language text, wherein each of said examples of natural language text belongs to at least one of a first classification and a second classification, and wherein said classifications are related to a meaning of said examples of natural language text;

with respect to each of said examples of natural language text, parsing said natural language text into at least a first chunk, wherein said at least a first chunk comprises a natural language word having at least one textual character;

assigning a rank to each chunk parsed from each of said examples of natural language text; and assigning a weight value to each chunk having at least a selected rank, wherein a chunk found in an example of natural language text belonging to said first classification and in an example of natural language text belonging to said second classification is assigned a first weight with respect to said first classification and a second weight corresponding to said second classification.

23. The method of claim 22, further comprising:

storing at least a first weight value having a non-zero value for an associated chunk.

24. The method of claim 23, wherein weight values equal to zero are discarded.

25. The method of claim 22, wherein chunks obtained from text belonging to a one of said classifications that are unique are discarded.

26. The method of claim 22, wherein chunks having more than one punctuation mark are discarded.

27. The method of claim 22, wherein only chunks having at most one punctuation mark are assigned a rank.

28. The method of claim 22, further comprising:

providing a natural language text belonging to said first classification;

dividing said provided natural language text into chunks;

totaling weight values associated with said chunks obtained from said provided natural language text, wherein a total weight value for said chunks with respect to said first classification is less than said total weight value for said chunks with respect to said second classification; and adjusting said assigned weight values.

29. The method of claim 28, wherein said step of adjusting said assigned weight values comprises at least one of raising a weight value for at least a first of said chunks with respect to said first classification and lowering a weight value for said at least a first of said chunks with respect to said second classification.

30. The method of claim 28, wherein said first classification comprises a plurality of subclassifications, wherein said first classification is directed to a first human physiological system and wherein said plurality of subclassifications are directed to conditions related to said first human physiological system.

* * * * *